(12) United States Patent
Bland et al.

(10) Patent No.: US 7,464,195 B2
(45) Date of Patent: Dec. 9, 2008

(54) METHOD AND APPARATUS FOR DETECTING A PRESENCE OF A DEVICE

(75) Inventors: Patrick M. Bland, Raleigh, NC (US); Randoph S. Kolvick, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 11/419,520

(22) Filed: May 22, 2006

(65) Prior Publication Data

US 2008/0005407 A1    Jan. 3, 2008

(51) Int. Cl.
G06F 3/00 (2006.01)
G06F 1/00 (2006.01)

(52) U.S. Cl. .............. 710/15; 710/17; 710/18; 713/500; 713/501; 713/502; 713/503

(58) Field of Classification Search ............ 710/15, 710/17, 18; 713/500, 501, 502, 503
See application file for complete search history.

(56) References Cited

U.S. PATENT DOCUMENTS

| | | |
|---|---|---|
| 5,120,909 A | 6/1992 | Kutz et al. |
| 6,362,996 B2 | 3/2002 | Chang |
| 2002/0005840 A1 | 1/2002 | Wicker |
| 2006/0059503 A1* | 3/2006 | Will et al. .................. 725/6 |

* cited by examiner

Primary Examiner—Niketa I Patel
(74) Attorney, Agent, or Firm—N. Artoush Ohanian; Cynthia S. Byrd; Biggers & Ohanian LLP.

(57) ABSTRACT

A method and apparatus are disclosed for detecting a presence of a device. Specifically, a method and a system are disclosed that may comprise providing a clock driver having a pair of differential clock signal lines capable of connection to a device, providing a presence detection signal for transmission through the pair of differential clock signal lines, determining whether the presence detection signal is received through the pair of differential clock signal lines, identifying the absence of the device if no presence detection signal is received through the pair of differential clock signal lines, identifying the presence of the device if the presence detection signal is received through the pair of differential clock signal lines, and notifying a system management module of the presence of the device.

3 Claims, 4 Drawing Sheets

METHOD AND APPARATUS FOR DETECTING A PRESENCE OF A DEVICE

BACKGROUND OF THE INVENTION

1. Field of the Invention

The field of the invention is clock drivers having device presence detection capabilities and methods and systems for detecting a presence of a device.

2. Description of Related Art

In an effort to improve reliability and serviceability of computer systems, computer architects often provide the capability of detecting the presence of a compatible device on a pluggable hardware interface such as, for example, slots for daughter cards on a motherboard or sockets for processor and memory chips. The capability of detecting whether a device is present on a given pluggable interface provides system management software with improved ability to isolate system faults that occur on a pluggable interface. Such an improved ability to isolate system faults allows system management software to more accurately identify correct field replacement units with a high degree of confidence.

Presence detection of devices that plug into a computer system is typically implemented using a dedicated signal pin on the hardware interface into which the device plugs. The dedicated signal pin typically carries a signal to indicate that a device is present whenever a compatible device is inserted into the pluggable hardware interface. When the device is removed from the pluggable hardware interface, the dedicated signal pin typically no longer carries the signal. The dedicated signal pin is typically sampled by circuit logic, such as, for example, an I²C expander input port, which allows system management software to identify whether a device is present.

The current approach of using dedicated signal pins does, however, have certain drawbacks. Dedicated signal pins for presence detection are not always available on every pluggable interface. On those pluggable interfaces for which dedicated signal pins are available, adding dedicated signal pins increases the overall cost of manufacturing the computer system. The overall cost of manufacturing the computer system rises because of the increase in cost to add dedicated signal pins to the pluggable hardware interface connector, to provide extra I²C components in the system to collect device status, and to add complexity to the printed circuit board to wire the signal.

SUMMARY OF THE INVENTION

A method and apparatus are disclosed for detecting a presence of a device. Specifically, a method and a system are disclosed that may comprise providing a clock driver having a pair of differential clock signal lines capable of connection to a device, providing a presence detection signal for transmission through the pair of differential clock signal lines, determining whether the presence detection signal is received through the pair of differential clock signal lines, identifying the absence of the device if no presence detection signal is received through the pair of differential clock signal lines, identifying the presence of the device if the presence detection signal is received through the pair of differential clock signal lines, and notifying a system management module of the presence of the device.

A clock driver apparatus having device presence detection capabilities is also disclosed. The clock driver apparatus may comprise a pair of differential clock signal lines capable of connection to a device, a presence detection signal line that provides a presence detection signal for transmission through the pair of differential clock signal lines, a control module that identifies the presence of the device when a presence detection signal is received through the pair of differential clock signal lines, a control module that identifies the absence of the device when no presence detection signal is received through the pair of differential clock signal lines, a switching circuit that enables the presence detection signal on one of the differential clock signal lines when the control module identifies the absence of the device, a switching circuit that disables the differential clock signals through the differential clock signal lines when the control module identifies the absence of the device, a switching circuit that disables the presence detection signal through the pair of differential clock signal lines when the control module identifies the presence of the device, a switching circuit that enables differential clock signals through the pair of differential clock signal lines when the control module identifies the presence of the device, and a control module that notifies a system management module of the presence of the device.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
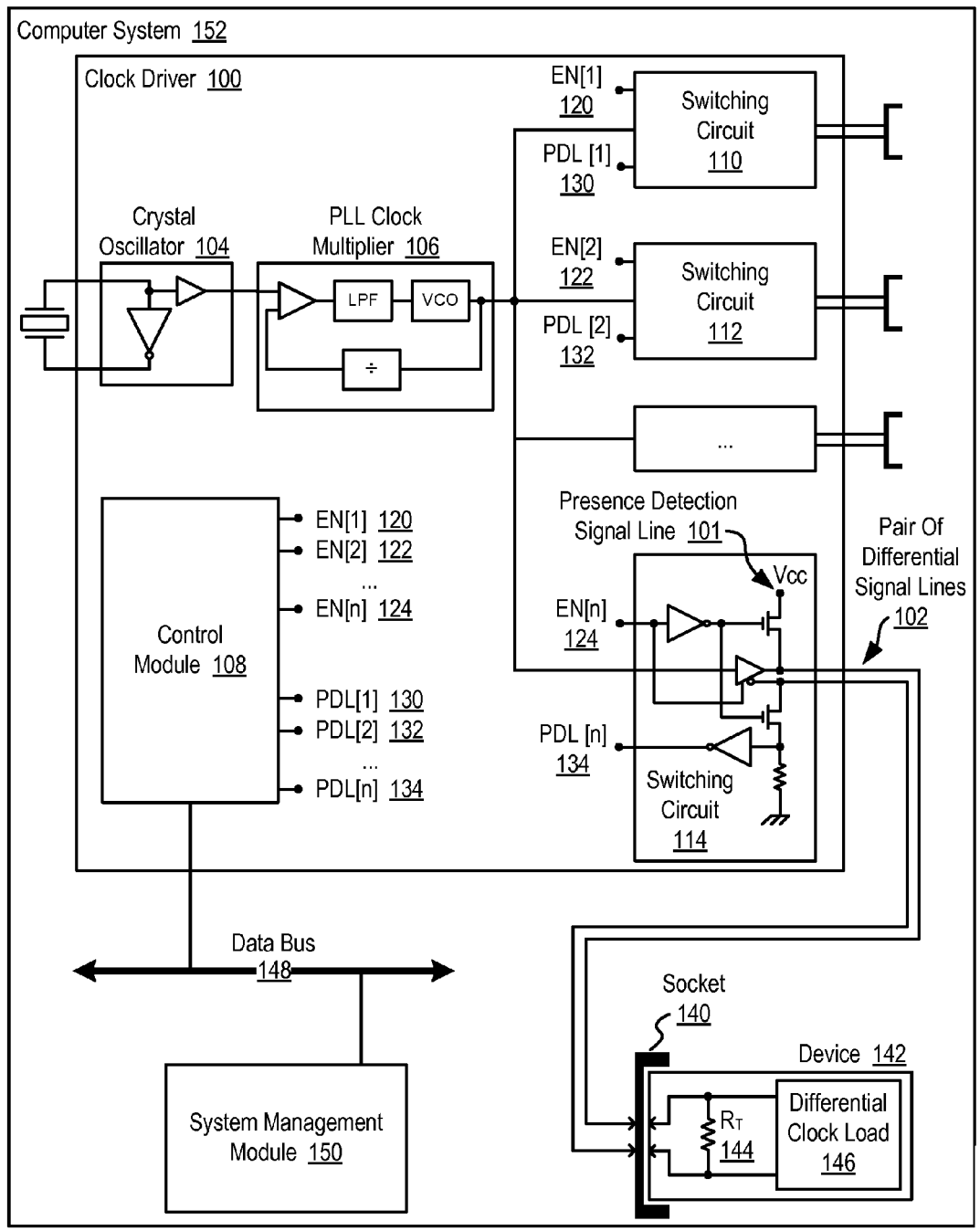
FIG. 1 sets forth a block diagram of computer hardware implementing an exemplary clock driver having device presence detection capabilities.

Exemplary methods, systems, and apparatus for detecting a presence of a device according to embodiments of the present invention are described with reference to the accompanying drawings, beginning with FIG. 1. FIG. 1 sets forth a block diagram of computer hardware implementing an exemplary clock driver (100) having device presence detection capabilities. The clock driver (100) of FIG. 1 is installed in a computer system (152). The computer system (152) is automated computing machinery for data processing. The clock driver (100) is computer hardware that generates differential clock signals for use in the electronic circuits of the computer system (152) and detects the presence of a device that connects to a pair of differential signal lines. Differential clock signals are a pair of clock signals in which one clock signal is the inverse of the other clock signal. Each clock signal oscillates between a high and a low state at regular intervals such as, for example, a square wave.

In the example of FIG. 1, the computer system (152) includes an exemplary device (142) that connects to the other components of the computer system (152) by plugging into a socket (140) of the computers system (152). The exemplary device (142) is a removable component of the computer system (152) that utilizes differential clock signals and includes a terminating resistor (144) connected in parallel with a differential clock load (146) of the device (142). Because the device (142) typically utilizes high-frequency differential clock signals, the terminating resistor (144) is located as close as possible to the differential clock signal pins of the device (142) that connects with the socket (140). The terminating resister (144) may range in value from 75 Ohms to 125 Ohms depending on the technology implemented by the device (142).

Devices that use differential clock signals from clock drivers having device presence detection capabilities according to embodiments of the present invention implement technologies that include a terminating resistor connected in parallel with a differential clock load of the device. Such technologies may include, for example, the Stub Series Terminated Logic ('SSTL') 2.5 V and 1.8 V technologies described in the specifications promulgated by the Joint Electron Device Engineering Council ('JEDEC'), or the Gunning Transceiver Logic Plus ('GTL+') technology developed by Fairchild Semiconductor as an upgraded version of GTL described in the specifications promulgated by the JEDEC. Examples of devices that may use differential clock signals provided by clock driver (100) having device presence detection capabilities according to embodiments of the present invention may include a Dual In-line Memory Module ('DIMM') used for Double-Data-Rate Synchronous Dynamic Random Access Memory ('DDR SDRAM'), computer processors, input/output integrated circuits, and other devices that utilize differential clock signals and include a resistor connected in parallel with a differential clock load as will occur to those of skill in the art.

Computer systems often use a clock signal to synchronize the actions of two or more electronic components in the system. In the example of FIG. 1, the clock driver (100) provides differential clock signals to a device (142) to synchronize the operation of the device (142) with the rest of the computer system (152). The clock driver (100) includes a pair of differential signal lines (102) capable of connection to the device (142) and capable of providing differential clock signals to the device (142). The pair of differential signal lines (102) connects to the device (142) when the device is plugged into a socket (140) of the computer system (152). One signal line of the pair of signal lines (102) carries a clock signal, while the other wire carries the inverse of the signal. Rather than reading the signal on only one of the clock signal lines (102) to identify a clock signal, the differential clock load (146) typically reads the difference between the signals on the pair of differential signal lines (102) across the resistor (144). Because the device (142) ignores the voltages of the differential clock signals on the pair of differential signal lines (102) with respect to ground, small changes in the ground potential between the clock driver (100) and the device (142) do not affect the device's ability to detect the clock signal. In addition, the differential signals are immune to many types of electrical interference because any disturbance tends to affect both the signal transmitted through the pair of differential clock signal lines (102) equally.

To provide the clock signals used to generate the differential clock signals, the clock driver (100) includes a crystal oscillator (104) and a phase-locked-loop ('PLL') clock multiplier (106). The crystal oscillator (104) is an electronic circuit that uses the mechanical resonance of a physical crystal of piezoelectric material along with an amplifier and a feedback loop to create an electrical signal with a very precise frequency. This precise frequency is used to provide a stable clock signal for the computer system (152).

The PLL clock multiplier (106) in the system of FIG. 1 is an electronic circuit that maintains a generated clock signal in a fixed phase relationship to a reference signal provided by the crystal oscillator (104). The PLL clock multiplier (106) includes a voltage-controlled oscillator ('VCO') that may be tuned to match a reference frequency using a phase comparator, a frequency divider, a low-pass filter ('LPF'), and a semiconductor diode in the VCO called a varactor. The phase comparator causes the voltage-controlled oscillator to seek and lock onto the reference frequency by means of a feedback scheme. If the voltage-controlled oscillator frequency departs from the reference frequency of the clock pulse, the phase comparator produces an error voltage that is applied to the varactor and brings the output frequency of the voltage-controlled oscillator back to the reference frequency. Abrupt changes to the error voltage applied to the varactor are smoothed by the low-pass filter. To increase the output frequency to a multiple of the reference frequency, the frequency divider is placed in the phase-locked loop's feedback path to divided-down the output frequency of the voltage-controlled oscillator fed-back into the phase comparator. Because the divided down output frequency is smaller than the reference frequency, the phase comparator generates a voltage signal to the voltage-controlled oscillator that increases the output frequency. The phase lock loop continues to increase the output frequency via the feedback loop until the divided-down output frequency from the voltage-controlled oscillator output equals the reference frequency. When the divided-down output frequency equals the reference frequency, the phase comparator stabilizes and generates no more signals to the voltage-controlled oscillator. The value of the output frequency from the voltage-controlled oscillator is the value of the reference frequency multiplied by the value of the frequency divider.

In the system of FIG. 1, the clock driver (100) includes a switching circuit (110, 112, 114) for each pair of differential signal lines. Each switching circuit (110, 112, 114) is an electronic circuit that switches the use of the pair of differential signal lines between transmitting differential clock signals to a device or detecting the presence of a device. Each switching circuit (110, 112, 114) includes a signal line labeled 'EN' that indicates whether to use the pair of differential signal lines for transmitting differential clock signals to a device or detecting the presence of a device. In the example of FIG. 1, switching circuit (110) includes 'EN[1]' (120), switching circuit (112) includes 'EN[2]' (122), . . . , and switching circuit (114) includes 'EN[n]' (124). a control module for the clock driver (100) controls the signals transmitted on the 'EN' signal lines (120, 122, 124).

In addition to the 'EN' signal lines (120, 122, 124), each switching circuit (110, 112, 114) includes a presence detection signal line (101) used to detect the presence of a device connecting to the pair of differential signal lines. The presence detection signal line (101) provides a presence detection signal for transmission through the pair of differential clock signal lines (102). The presence detection signal line (101) may be implemented as the '$V_{cc}$' power rail of the clock driver (100), an auxiliary power rail, or any other signal line as will occur to those of skill in the art.

In the example of FIG. 1, when the 'EN' signal line (124) indicates that the pair of differential signal lines is to be used to transmit the differential clock signals to a device, the switching circuit (114) enables differential clock signals through the pair of differential clock signal lines (102) and disables the presence detection signal through the pair of differential clock signal lines (102). When the 'EN' signal line (124) indicates that the pair of differential signal lines is to be used to detect the presence of a device, the switching circuit (114) disables differential clock signals through the pair of differential clock signal lines (102) and enables the presence detection signal on one of the differential clock signal lines (102).

The switching circuit (114) may be implemented using the exemplary circuit depicted in the example of FIG. 1. The circuit depicted in the example of FIG. 1 includes two field-effect transistor ('FET') switches, two inverters, one buffer/inverter, and a pull-down resistor. For explanation of the circuit depicted in the example of FIG. 1, consider that a voltage HIGH signal on the 'EN' signal line (124) indicates that the pair of differential signal lines is to be used to transmit the differential clock signals to a device, and a voltage LOW signal on the 'EN' signal line (124) indicates that the pair of differential signal lines is to be used to detect the presence of a device connected to the differential signal lines.

In the exemplary switching circuit (114) depicted in FIG. 1, when the 'EN' signal line (124) carries a voltage HIGH signal, the buffer/inverter is enabled and the two FET switches are disabled. The disabled FET switches prevent the presence detection signal on the presence detection signal line (101) from being transmitted on the pair of differential signal lines (102). The enabled buffer/inverter, however, allows the switching circuit (114) to transmit the differential clock signals generated from the clock signal received from the PLL clock multiplier (106) through the pair of differential signal lines (102).

Continuing with the exemplary switching circuit (114) depicted in FIG. 1, when the 'EN' signal line (124) carries a voltage LOW signal, the buffer/inverter is disabled and the two FET switches are enabled. The disabled buffer/inverter prevents the differential clock signals from being transmitted on the pair of differential signal lines (102). The enabled FET switches, however, allow the switching circuit (114) to transmit the presence detection signal through one of the differential clock signal lines (102) to the socket (140). When the device (142) plugs into the socket (140), the presence detection signal travels through the terminating resistor (144) of the device (142) and back to the switching circuit (114) through the other signal line of the pair of differential clock signal lines (102). The enabled FET switches then allow the presence detection signal to be inverted and sent along a presence detection line ('PDL') (134) to the control module (108).

In the example of FIG. 1, the clock driver (100) includes a control module (108) that controls whether the switching circuits (110, 112, 114) use their respective pair of differential signal lines for transmitting differential clock signals to a device or detecting the presence of a device. The control module (108) of FIG. 1 is computer hardware that includes input/output logic and bus interface logic. The control module (108) controls whether the switching circuits (110, 112, 114) use their respective pair of differential signal lines for transmitting differential clock signals to a device or detecting the presence of a device. The control module (108) controls the switching circuits (110, 112, 114) by transmitting as output either a voltage HIGH or voltage LOW signal on the 'EN' signal line (120, 122, 124) corresponding to a particular switching circuit (110, 112, 114). In the example of FIG. 1, a voltage HIGH signal on one of the 'EN' signal lines (120, 122, 124) indicates that the corresponding switching circuit is to use its pair of differential signal lines for transmitting differential clock signals to a device. a voltage LOW signal on one of the 'EN' signal lines (120, 122, 124) indicates that the corresponding switching circuit is to use its pair of differential signal lines for detecting the presence of a device.

In the example of FIG. 1, the control module (108) receives as input a presence detection signal on the 'PDL' signal lines (130, 132, 134) from the switching circuits (110, 112, 114). Readers will recall from above that a presence detection signal may only reach the control module (108) through the pair of differential clock lines (102) when the device (142) plugs into the socket (140) and switching circuit (114) uses the pair of differential signal lines (102) for presence detection. When a presence detection signal is received through the pair of differential clock signal lines (102) while the switching circuit (114) uses the pair of differential signal lines (102) for presence detection, therefore, the control module (108) identifies the presence of the device (142). When no presence detection signal is received through the pair of differential clock signal lines (102) while the switching circuit (114) uses the pair of differential signal lines (102) for presence detection, however, the control module (108) identifies the absence of the device (142). As mentioned above, the switching circuits (110, 112, 114) in the example of FIG. 1 invert a present detection signal before the signal reaches the control module (108). A voltage LOW signal on the 'PDL' signal lines (130, 132, 134) in the example of FIG. 1, therefore, represents a presence detection signal to the control module (108), and a voltage HIGH signal on the 'PDL' signal lines (130, 132, 134) represents no presence detection signal to the control module (108).

When the control module (108) in the example of FIG. 1 identifies the presence of the device (142), the control module transmits a voltage HIGH signal on the 'EN' signal line (124) to the switching circuit (114). The switching circuit (114) then disables the presence detection signal through the pair of differential clock signal lines (102) and enables differential clock signals through the pair of differential clock signal lines (102) as discussed above. When the control module (108) in the example of FIG. 1 identifies the absence of the device (142), the control module transmits a voltage LOW signal on the 'EN' signal line (124) to the switching circuit (114). The switching circuit (114) then disables the differential clock signals through the differential clock signal lines (102) and enables the presence detection signal on one of the differential clock signal lines (102) as discussed above.

In the example of FIG. 1, the computer system (152) includes a system management module (150). The system management module (150) is an embedded computer system for controlling computer resources provided by the computer system (152). The system management module (150) communicates with system management software that manages the resources provided by the computer system (152). The system management module (150) may communicate with the system management software using memory mapped input/output or through a data communications connection such as, for example, a data communications connection implemented using the Transmission Control Protocol ('TCP') and the Internet Protocol ('IP').

In the example of FIG. 1, the control module (108) notifies the system management module (150) of the presence or the absence of the device (142). The control module (108) communicates to the system management module (150) through a data communications connection implemented on a data bus (148). The data communications connection on the data bus (148) may be implemented using, for example, the Inter-Integrated Circuit ('I$^2$C') Bus Protocol. The I$^2$C Bus Protocol is a serial computer bus protocol for connecting electronic components inside a computer that was first published in 1982 by Philips. I$^2$C is a simple, low-bandwidth, short-distance protocol. Most available I$^2$C devices operate at speeds up to 400 Kbps, although some I$^2$C devices are capable of operating up at speeds up to 3.4 Mbps. I²C is easy to use to link multiple devices together since it has a built-in addressing scheme. Current versions of the I²C have a 10-bit addressing mode with the capacity to connect up to 1008 nodes. Although the data communications connection between the control module (108) and the system management module (150) may be implemented on the data bus (148) using I²C, such an implementation is for explanation and not for limitation. The data communication connection may also be implemented using other protocols such as, for example, the Serial Peripheral Interface ('SPI') Bus Protocol, the Microwire Protocol, the System Management Bus ('SMBus') Protocol, and so on. Through the data communications connection implemented on the data bus (148), the system management module (150) or system management software may communicate with the control module (108) to identify the presence or absence of devices plugged into the sockets connected to the clock driver (100) through the pairs of differential signal lines. Furthermore, the system management module (150) or system management software may communicate with the control module (108) to control whether the pairs of differential signal lines (102) are used for transmitting differential clock signals or for presence detection.

As mentioned above, the exemplary computer system (152) is automated computing machinery for data processing. Although not depicted in FIG. 1, the computer system (152) may include other components connected to the clock driver (100), the sockets connected to the clock driver (100), and the system management module (150) to process data in the exemplary computer system (152). Other components may include one or more processors, random-access memory, non-volatile storage, input/output adapters, network adapters, and any other components as will occur to those of skill in the art.

Figure 2:
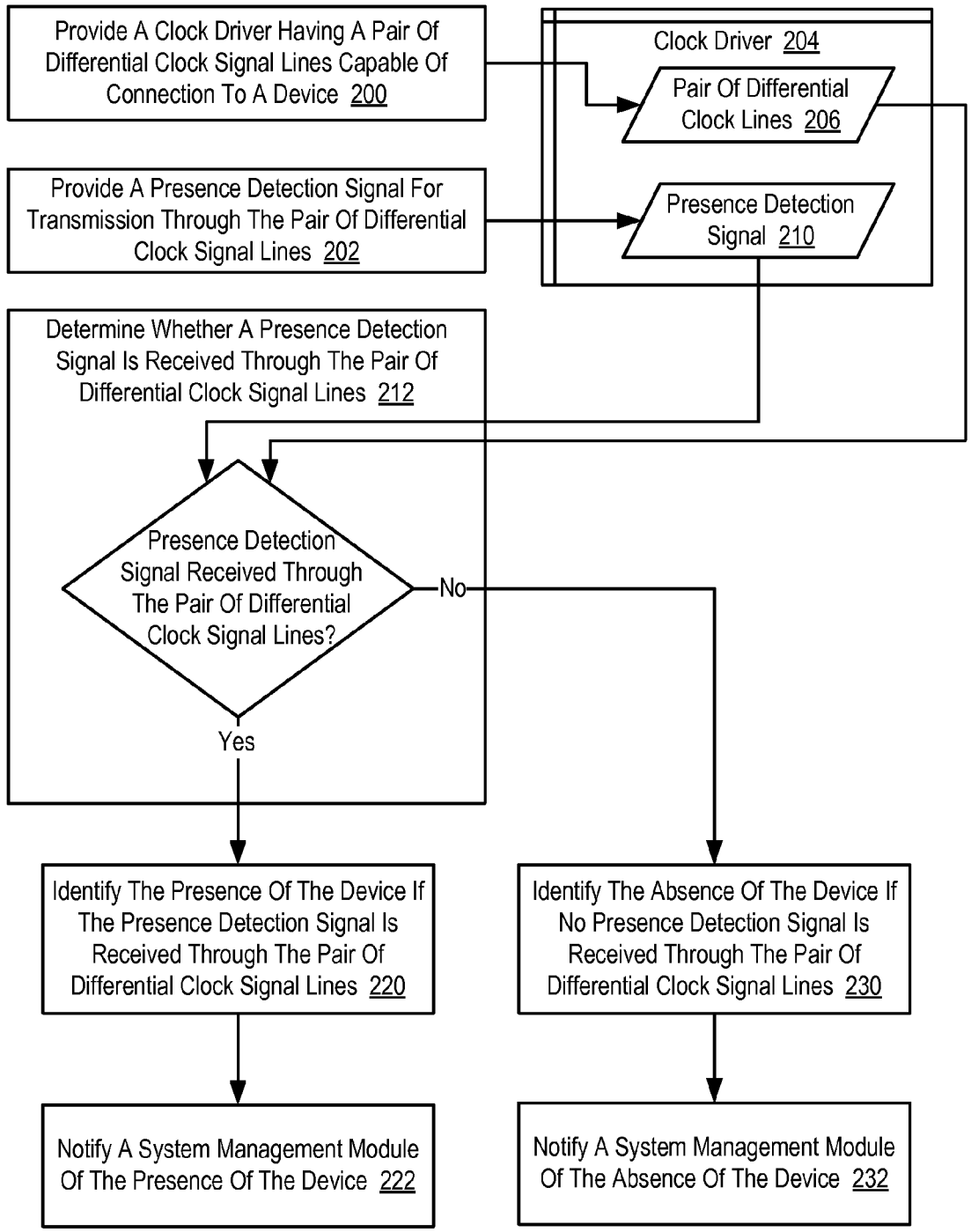
FIG. 2 sets forth a flow chart illustrating an exemplary method for detecting a presence of a device according to embodiments of the present invention.

For further explanation, FIG. 2 sets forth a flow chart illustrating an exemplary method for detecting a presence of a device according to embodiments of the present invention. The method of FIG. 2 includes providing (200) a clock driver (204) having a pair of differential clock signal lines (206) capable of connection to a device. As mentioned above, the clock driver (204) generates differential clock signals for use in the electronic circuits of a computer system and has device presence detection capabilities such as, for example, the clock driver described above with reference to FIG. 1. The clock driver (204) in the example of FIG. 2 includes a pair of differential clock lines (206). The pair of differential clock lines (206) represents a pair of differential clock lines such as for example the pair of differential clock lines (102) described above with reference to FIG. 1.

The method of FIG. 2 also includes providing (202) a presence detection signal (210) for transmission through the pair of differential clock signal lines (206). In the example of FIG. 2, therefore, the clock driver (204) includes a presence detection signal (210) that represents a presence detection signal for transmission through the pair of differential clock signal lines (210). The presence detection signal (210) represents an electric signal used to detect the presence of a device capable of connecting to the clock driver (204). Providing (202) a presence detection signal (210) for transmission through the pair of differential clock signal lines (206) may be carried out by using a presence detection signal line of the clock driver (204) such as, for example, the $V_{cc}$ or $V_{AUX}$ power rail as described above with reference to FIG. 1.

The method of FIG. 2 includes determining (212) whether the presence detection signal (210) is received through the pair of differential clock signal lines (206). Determining (212) whether the presence detection signal (210) is received through the pair of differential clock signal lines (206) may be carried out by determining by a control module of the clock driver (204) whether the voltage level on a presence detect line is voltage HIGH or LOW. The presence detect line is a signal line such as, for example, the presence detect line described above with reference to FIG. 1. a voltage HIGH voltage level indicates that the presence detection signal (210) is not received through the pair of differential clock signal lines (206). a voltage LOW voltage level indicates that the presence detection signal (210) is received through the pair of differential clock signal lines (206).

The method of FIG. 2 includes identifying (220) the presence of the device if the presence detection signal (210) is received through the pair of differential clock signal lines (206). Identifying (220) the presence of the device may be carried out by sampling by a control module of the clock driver (204) the voltage level on the presence detect line of the control module. a voltage LOW voltage level may, for example, indicate the presence of a device. Identifying (220) the presence of the device may further be carried out by disabling (300) by a control module and switching circuit of the clock driver (204) the presence detection signal (210) through the pair of differential clock signal lines (206) when the presence of the device is identified, and enabling (302) by a control module and switching circuit of the clock driver (204) differential clock signals through the pair of differential clock signal lines (206) when the presence of the device is identified as described below with reference to FIG. 3.

The method of FIG. 2 continues by notifying (222) a system management module of the presence of the device when the presence of the device is identified. Notifying (222) a system management module of the presence of the device may be carried out by sending by a control module of the clock driver (204) a message to a system management module through a data communications connection. The data communications connection may be implemented using, for example, the I²C Bus Protocol.

The method of FIG. 2 includes identifying (230) the absence of the device if no presence detection signal (210) is received through the pair of differential clock signal lines (206). Identifying (230) the absence of the device may be carried out by sampling by a control module of the clock driver (204) the voltage level on the presence detect line of the control module. a voltage HIGH voltage level may, for example, indicate the absence of a device. Identifying (230) the absence of the device may be carried out by enabling (400) by a control module and switching circuit of the clock driver (204) the presence detection signal on one of the differential clock signal lines (206) when the absence of the device is identified, and disabling (402) by a control module and switching circuit of the clock driver (204) the differential clock signals through the differential clock signal lines (206) when the absence of the device is identified as described below with reference to FIG. 4.

The method of FIG. 2 continues by notifying (232) a system management module of the absence of the device when the presence of the device is identified. Notifying (232) a system management module of the absence of the device may be carried out by sending by a control module of the clock driver (204) a message to a system management module through a data communications connection. The data communications connection may be implemented using, for example, the I²C Bus Protocol.

Readers will recall from above that identifying the presence of the device may be carried out by disabling the presence detection signal through the pair of differential clock signal lines, and enabling differential clock signals through the pair of differential clock signal lines. For further explanation, therefore, FIG. 3 sets forth a flow chart illustrating a further exemplary method for detecting a presence of a device according to embodiments of the present invention that includes disabling (300) the presence detection signal (210) through the pair of differential clock signal lines (206) when the presence of the device is identified, and enabling (302) differential clock signals through the pair of differential clock signal lines (206) when the presence of the device is identified.

Figure 3:
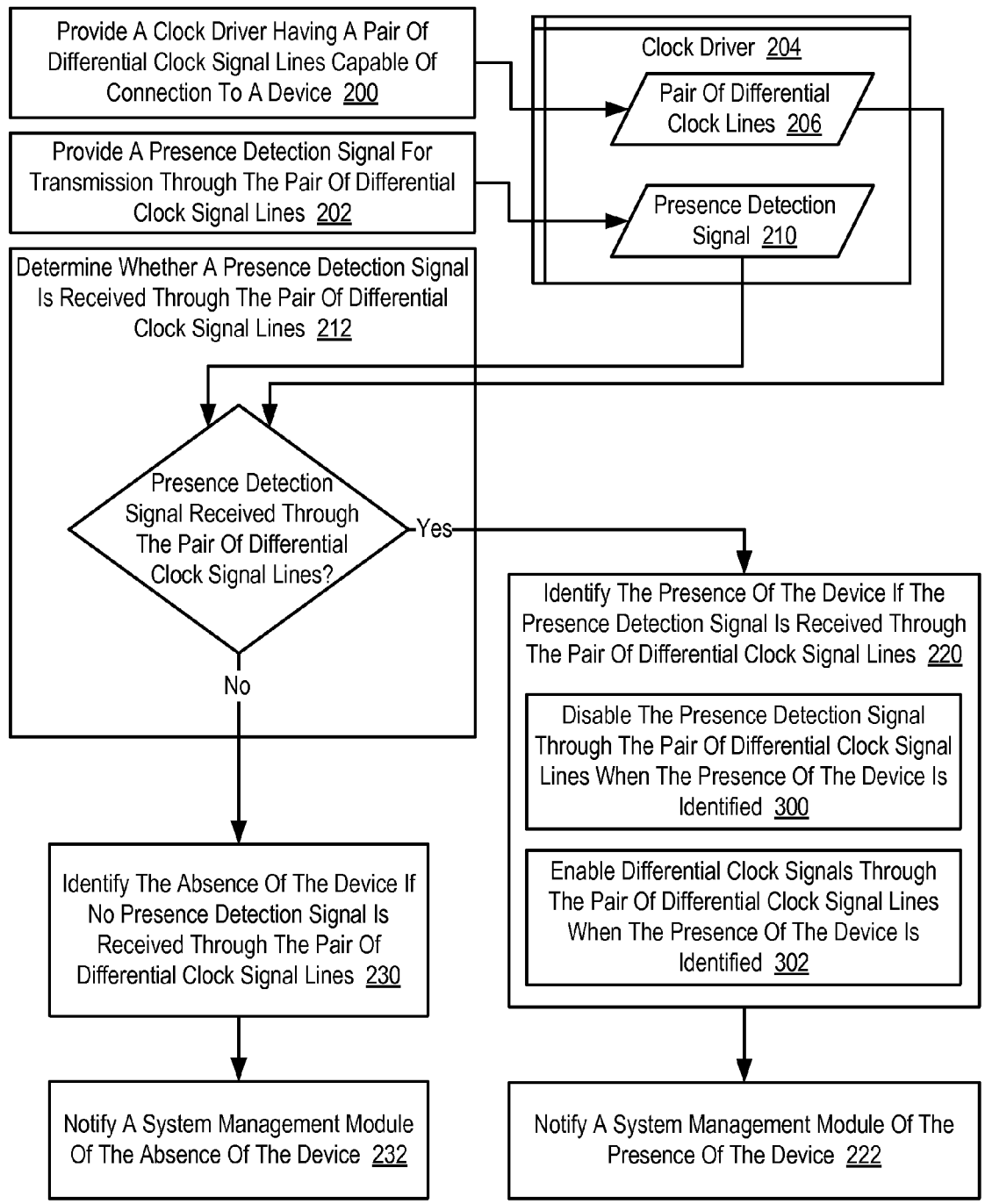
FIG. 3 sets forth a flow chart illustrating a further exemplary method for detecting a presence of a device according to embodiments of the present invention.

The method of FIG. 3 is similar to the method of FIG. 2. That is, the method of FIG. 3 is similar to the method of FIG. 2 in that the method of FIG. 3 includes providing (200) a clock driver having a pair of differential clock signal lines (206) capable of connection to a device, providing (202) a presence detection signal (210) for transmission through the pair of differential clock signal lines (206), determining (212) whether the presence detection signal (210) is received through the pair of differential clock signal lines (206), identifying (220) the presence of the device if the presence detection signal (210) is received through the pair of differential clock signal lines (206), notifying (222) a system management module of the presence of the device, identifying (230) the absence of the device if no presence detection signal (210) is received through the pair of differential clock signal lines (206), and notifying (232) a system management module of the absence of the device. The example of FIG. 3 is similar to the example of FIG. 2 in that the example of FIG. 3 also includes clock driver (204), a pair of differential clock lines (206), and a presence detection signal (210).

In the method of FIG. 3, identifying (220) the presence of the device if the presence detection signal (210) is received through the pair of differential clock signal lines (206) includes disabling (300) the presence detection signal (210) through the pair of differential clock signal lines (206) when the presence of the device is identified. Disabling (300) the presence detection signal (210) through the pair of differential clock signal lines (206) may be carried out by transmitting by a control module of the clock driver (204) a voltage HIGH signal on an 'EN' signal line to a switching circuit of the clock driver (204) as described above with reference to FIG. 1.

In the method of FIG. 3, identifying (220) the presence of the device if the presence detection signal (210) is received through the pair of differential clock signal lines (206) also includes enabling (302) differential clock signals through the pair of differential clock signal lines (206) when the presence of the device is identified. Enabling (302) differential clock signals through the pair of differential clock signal lines (206) may be carried out by transmitting by a control module of the clock driver (204) a voltage HIGH signal on an 'EN' signal line to a switching circuit of the clock driver (204) as described above with reference to FIG. 1.

Readers will recall from above that identifying the absence of the device may be carried out by enabling the presence detection signal on one of the differential clock signal lines and disabling the differential clock signals through the differential clock signal lines is identified as described below with reference to FIG. 4. For further explanation, therefore, FIG. 4 sets forth a flow chart illustrating a further exemplary method for detecting a presence of a device according to embodiments of the present invention that includes enabling (400) the presence detection signal on one of the differential clock signal lines (206) when the absence of the device is identified, and disabling (402) the differential clock signals through the differential clock signal lines (206) when the absence of the device is identified.

Figure 4:
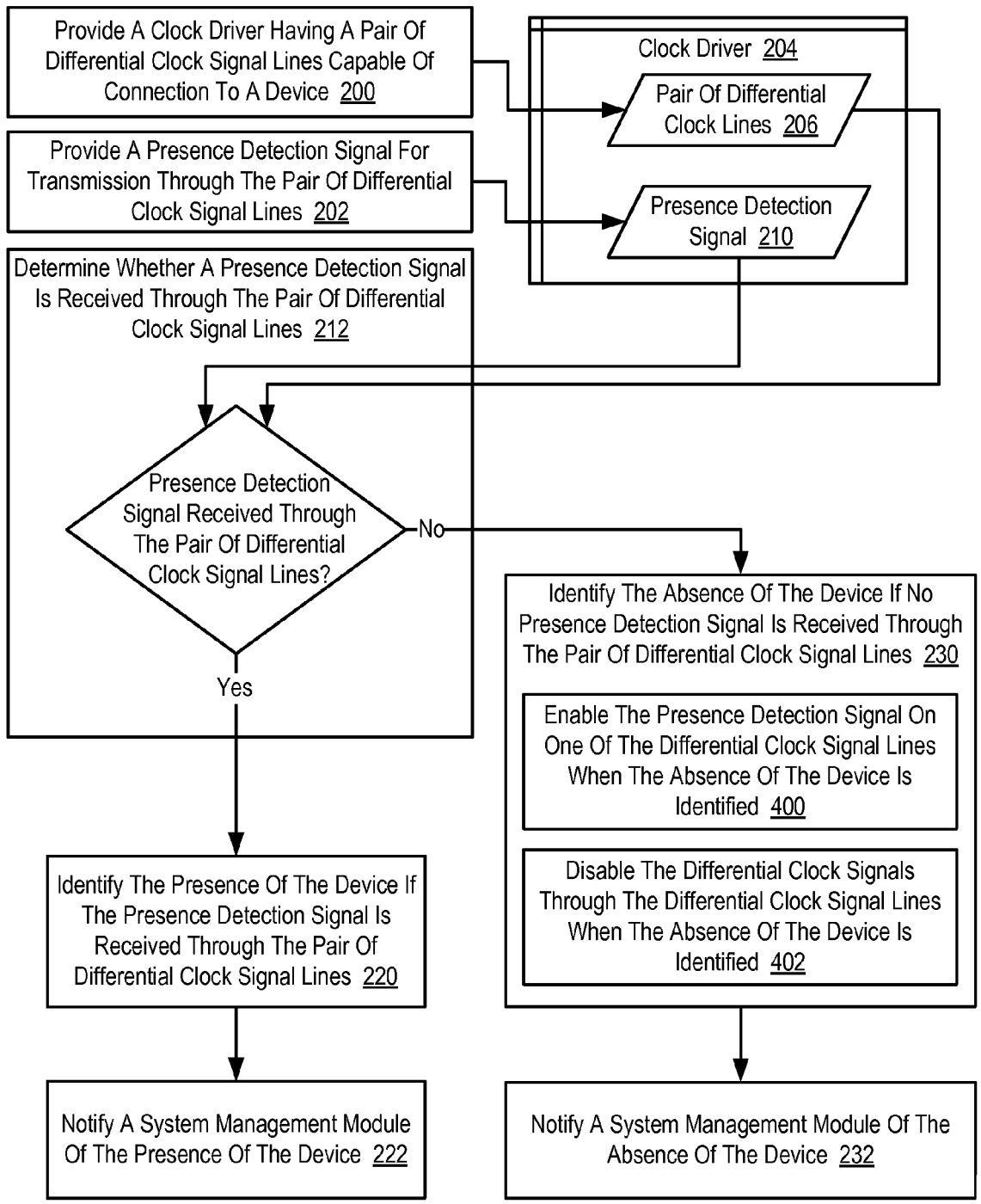
FIG. 4 sets forth a flow chart illustrating a further exemplary method for detecting a presence of a device according to embodiments of the present invention.

The method of FIG. 4 is similar to the method of FIG. 2. That is, the method of FIG. 4 is similar to the method of FIG. 2 in that the method of FIG. 4 includes providing (200) a clock driver having a pair of differential clock signal lines (206) capable of connection to a device, providing (202) a presence detection signal (210) for transmission through the pair of differential clock signal lines (206), determining (212) whether the presence detection signal (210) is received through the pair of differential clock signal lines (206), identifying (220) the presence of the device if the presence detection signal (210) is received through the pair of differential clock signal lines (206), notifying (222) a system management module of the presence of the device, identifying (230) the absence of the device if no presence detection signal (210) is received through the pair of differential clock signal lines (206), and notifying (232) a system management module of the absence of the device. The example of FIG. 4 is similar to the example of FIG. 2 in that the example of FIG. 4 also includes clock driver (204), a pair of differential clock lines (206), and a presence detection signal (210).

In the method of FIG. 4, identifying (230) the absence of the device if no presence detection signal (210) is received through the pair of differential clock signal lines (206) includes enabling (400) the presence detection signal on one of the differential clock signal lines (206) when the absence of the device is identified. Enabling (400) the presence detection signal on one of the differential clock signal lines (206) may be carried out by transmitting by a control module of the clock driver (204) a voltage LOW signal on an 'EN' signal line to a switching circuit of the clock driver (204) as described above with reference to FIG. 1.

In the method of FIG. 4, identifying (230) the absence of the device if no presence detection signal (210) is received through the pair of differential clock signal lines (206) includes disabling (402) the differential clock signals through the differential clock signal lines (206) when the absence of the device is identified. Disabling (402) the differential clock signals through the differential clock signal lines (206) may be carried out by transmitting by a control module of the clock driver (204) a voltage LOW signal on an 'EN' signal line to a switching circuit of the clock driver (204) as described above with reference to FIG. 1.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:
1. A method for detecting a presence of a device, the method comprising:
providing a clock driver having a pair of differential clock signal lines capable of connection to a device, wherein one signal line of the pair of signal lines carries a clock signal, while the other wire carries the inverse of the signal;
providing a presence detection signal for transmission through the pair of differential clock signal lines;
determining whether the presence detection signal is received through the pair of differential clock signal lines;
identifying the absence of the device if no presence detection signal is received through the pair of differential clock signal lines, further comprising;

enabling the presence detection signal on one of the differential clock signal lines when the absence of the device is identified; and disabling the differential clock signals through the differential clock signal lines when the absence of the device is identified;

identifying the presence of the device if the presence detection signal is received through the pair of differential clock signal lines, further comprising:

enabling differential clock signals through the pair of differential clock signal lines when the presence of the device is identified; and disabling the presence detection signal through the pair of differential clock signal lines when the presence of the device is identified; and notifying a system management module of the presence of the device.

2. A system for detecting a presence of a device, the system comprising:

means for providing a clock driver having a pair of differential clock signal lines capable of connection to a device;

means for providing a presence detection signal for transmission through the pair of differential clock signal lines;

means for identifying the absence of the device if no presence detection signal is received through the pair of differential clock signal lines;

means for determining whether the presence detection signal is received through the pair of differential clock signal lines, further comprising:

means for disabling the presence detection signal through the pair of differential clock signal lines when the presence of the device is identified; and means for enabling differential clock signals through the pair of differential clock signal lines when the presence of the device is identified; and means for identifying the presence of the device if the presence detection signal is received through the pair of differential clock signal lines.

3. A clock driver having device presence detection capabilities, the clock driver comprising:

a pair of differential clock signal lines capable of connection to a device;

a presence detection signal line that provides a presence detection signal for transmission through the pair of differential clock signal lines;

a control module that identifies the presence of the device when a presence detection signal is received through the pair of differential clock signal lines;

a control module identifies the absence of the device when no presence detection signal is received through the pair of differential clock signal lines;

a switching circuit that enables the presence detection signal on one of the differential clock signal lines when the control module identifies the absence of the device;

a switching circuit that disables the differential clock signals through the differential clock signal lines when the control module identifies the absence of the device;

a switching circuit that disables the presence detection signal through the pair of differential clock signal lines when the control module identifies the presence of the device;

a switching circuit that enables differential clock signals through the pair of differential clock signal lines when the control module identifies the presence of the device; and a control module that notifies a system management module of the presence of the device.

* * * * *